(12) United States Patent
Grand

(10) Patent No.: US 11,023,598 B2
(45) Date of Patent: Jun. 1, 2021

(54) DOCUMENT-LEVEL ATTRIBUTE-BASED ACCESS CONTROL

(71) Applicant: Elasticsearch B.V., Mountain View, CA (US)

(72) Inventor: Adrien Grand, Maisoncelles-Pelvey (FR)

(73) Assignee: Elasticsearch B.V., Amsterdam (NL)

( * ) Notice: Subject to any disclaimer, the term of this patent is extended or adjusted under 35 U.S.C. 154(b) by 296 days.

(21) Appl. No.: 16/212,475

(22) Filed: Dec. 6, 2018

(65) Prior Publication Data

US 2020/0184090 A1    Jun. 11, 2020

(51) Int. Cl.
*H04L 29/06* (2006.01)
*G06F 21/62* (2013.01)
*G06F 16/35* (2019.01)
*G06F 16/33* (2019.01)

(52) U.S. Cl.
CPC .............. *G06F 21/62* (2013.01); *G06F 16/33* (2019.01); *G06F 16/35* (2019.01); *H04L 63/20* (2013.01)

(58) Field of Classification Search
None
See application file for complete search history.

(56) References Cited

U.S. PATENT DOCUMENTS

| 7,130,839 | B2 | 10/2006 | Boreham et al. |
| 7,324,953 | B1 | 1/2008 | Murphy |
| 7,333,943 | B1 | 2/2008 | Charuk et al. |
| 7,644,432 | B2 | 1/2010 | Patrick et al. |
| 7,650,505 | B1 | 1/2010 | Masurkar |
| 7,685,430 | B1 | 3/2010 | Masurkar |
| 7,730,523 | B1 | 6/2010 | Masurkar |
| 7,801,967 | B1 | 9/2010 | Bedell et al. |
| 7,970,791 | B2 | 6/2011 | Liao et al. |
| 7,975,292 | B2 | 7/2011 | Corella |

(Continued)

OTHER PUBLICATIONS

Willnauer, Daniel, "Default Password Removal," U.S. Appl. No. 16/047,959, Jul. 27, 2018, Specification, Claims, Abstract, and Drawings, 37 pages.

(Continued)

*Primary Examiner* — Joseph P Hirl
*Assistant Examiner* — Hassan Saadoun
(74) *Attorney, Agent, or Firm* — Carr & Ferrell LLP

(57) ABSTRACT

Methods and systems for a document-level attribute-based access control service are provided. The document-level attribute-based access control service may be positioned between a directory service and a search engine service. The directory service can manage information and permissions for users. The document-level attribute-based access control service can map security attributes to the user based on the information and permissions. Based on the mapping, it can be determined whether to permit the user making a query to the search engine service to access documents based on the query. Information and permissions attributes can be injected into queries dynamically via a template. Attributes may be combined with role query templates to create document-level attribute-based access control on top of role-based access control. The present technology can enable enforcement of security policies requiring all of a combination of attributes to be satisfied before permitting certain access.

18 Claims, 10 Drawing Sheets

(56) References Cited

U.S. PATENT DOCUMENTS

| | | |
|---|---|---|
| 7,996,392 B2 | 8/2011 | Liao et al. |
| 8,005,816 B2 | 8/2011 | Krishnaprasad et al. |
| 8,027,982 B2 | 9/2011 | Ture et al. |
| 8,166,310 B2 | 4/2012 | Harrison et al. |
| 8,214,394 B2 | 7/2012 | Krishnaprasad et al. |
| 8,239,414 B2 | 8/2012 | Liao et al. |
| 8,332,430 B2 | 12/2012 | Koide et al. |
| 8,352,475 B2 | 1/2013 | Bhatkar et al. |
| 8,412,717 B2 | 4/2013 | Liao et al. |
| 8,433,712 B2 | 4/2013 | Koide et al. |
| 8,548,997 B1 | 10/2013 | Wu |
| 8,595,255 B2 | 11/2013 | Krishnaprasad et al. |
| 8,601,028 B2 | 12/2013 | Liao et al. |
| 8,626,794 B2 | 1/2014 | Liao et al. |
| 8,707,451 B2 | 4/2014 | Ture et al. |
| 8,725,770 B2 | 5/2014 | Koide et al. |
| 8,793,489 B2 | 7/2014 | Polunin et al. |
| 8,838,961 B2 | 9/2014 | Zarfoss, III et al. |
| 8,875,249 B2 | 10/2014 | Ture et al. |
| 9,069,979 B2 | 6/2015 | Srinivasan et al. |
| 9,071,606 B2 | 6/2015 | Braun et al. |
| 9,081,816 B2 | 7/2015 | Krishnaprasad et al. |
| 9,081,950 B2 | 7/2015 | Jain et al. |
| 9,130,920 B2 | 9/2015 | Pelykh |
| 9,177,124 B2 | 11/2015 | Krishnaprasad et al. |
| 9,251,364 B2 | 2/2016 | Ture et al. |
| 9,288,042 B1 | 3/2016 | Madhukar et al. |
| 9,407,433 B1 | 8/2016 | Sohi et al. |
| 9,436,968 B1 | 9/2016 | Kobets et al. |
| 9,467,437 B2 | 10/2016 | Krishnaprasad et al. |
| 9,479,494 B2 | 10/2016 | Krishnaprasad et al. |
| 9,594,922 B1 | 3/2017 | McGuire et al. |
| 9,734,309 B1 | 8/2017 | Allen |
| 9,742,779 B2 | 8/2017 | Ngo et al. |
| 9,781,102 B1 | 10/2017 | Knjazihhin et al. |
| 9,858,195 B2 | 1/2018 | Bhogal et al. |
| 9,930,033 B2 | 3/2018 | Chhabra et al. |
| 10,083,247 B2 | 9/2018 | Brown et al. |
| 10,114,964 B2 | 10/2018 | Ramesh et al. |
| 10,382,421 B2 | 8/2019 | Krishnaprasad et al. |
| 10,505,982 B2 | 12/2019 | Motukuru et al. |
| 10,659,307 B2 | 5/2020 | Sinn |
| 2003/0037234 A1 | 2/2003 | Fu et al. |
| 2003/0105742 A1 | 6/2003 | Boreham et al. |
| 2003/0130928 A1 | 7/2003 | Chozick |
| 2004/0210767 A1 | 10/2004 | Sinclair et al. |
| 2005/0055232 A1 | 3/2005 | Yates |
| 2006/0059359 A1 | 3/2006 | Reasor et al. |
| 2007/0208714 A1* | 9/2007 | Ture ................. G06F 16/951 |
| 2007/0233688 A1 | 10/2007 | Smolen et al. |
| 2008/0205655 A1 | 8/2008 | Wilkins et al. |
| 2008/0313712 A1* | 12/2008 | Ellison ............... H04L 63/101 726/4 |
| 2009/0046862 A1 | 2/2009 | Ito et al. |
| 2009/0106271 A1* | 4/2009 | Chieu ................. G06F 16/33 |
| 2009/0204590 A1 | 8/2009 | Yaskin et al. |
| 2009/0254642 A1 | 10/2009 | Geist |
| 2009/0271624 A1 | 10/2009 | Cao et al. |
| 2010/0022306 A1 | 1/2010 | Campion |
| 2010/0146611 A1 | 6/2010 | Kuzin et al. |
| 2010/0198804 A1 | 8/2010 | Yaskin et al. |
| 2011/0265160 A1 | 10/2011 | Nettleton |
| 2012/0060207 A1* | 3/2012 | Mardikar ............. H04L 63/105 726/4 |
| 2012/0090037 A1 | 4/2012 | Levit |
| 2012/0151563 A1 | 6/2012 | Bolik et al. |
| 2013/0080520 A1 | 3/2013 | Kiukkonen et al. |
| 2013/0152191 A1 | 6/2013 | Bright et al. |
| 2013/0212703 A1 | 8/2013 | Ramesh et al. |
| 2013/0232539 A1 | 9/2013 | Polunin et al. |
| 2013/0326588 A1 | 12/2013 | Jain et al. |
| 2014/0075501 A1 | 3/2014 | Srinivasan et al. |
| 2014/0196115 A1 | 7/2014 | Pelykh |
| 2014/0208100 A1 | 7/2014 | Kendall |
| 2014/0337941 A1 | 11/2014 | Kominar et al. |
| 2015/0012919 A1 | 1/2015 | Moss et al. |
| 2015/0089575 A1* | 3/2015 | Vepa .................. G06F 21/62 726/1 |
| 2015/0112870 A1 | 4/2015 | Nagasundaram et al. |
| 2015/0169875 A1 | 6/2015 | Ide et al. |
| 2015/0363607 A1 | 12/2015 | Yang et al. |
| 2016/0173475 A1 | 6/2016 | Srinivasan et al. |
| 2017/0083698 A1 | 3/2017 | Scott et al. |
| 2017/0103470 A1 | 4/2017 | Raju |
| 2017/0134434 A1 | 5/2017 | Allen |
| 2017/0353444 A1 | 12/2017 | Karangutkar et al. |
| 2018/0210901 A1 | 7/2018 | DePaoli et al. |
| 2018/0300117 A1 | 10/2018 | Ackerman |
| 2018/0367528 A1 | 12/2018 | Schwarz et al. |
| 2019/0018869 A1 | 1/2019 | Bhagwat et al. |
| 2019/0018870 A1 | 1/2019 | Bhagwat et al. |
| 2019/0052537 A1 | 2/2019 | Sinn |
| 2019/0394040 A1 | 12/2019 | Modi |
| 2020/0007549 A1 | 1/2020 | Gormley |
| 2020/0036522 A1 | 1/2020 | Willnauer |
| 2020/0036527 A1 | 1/2020 | Girdhar et al. |

OTHER PUBLICATIONS

Willnauer, Daniel, "Shard Splitting," U.S. Appl. No. 16/176,956 , Oct. 31, 2018, Specification, Claims, Abstract, and Drawings, 47 pages.

Willnauer, Simon Daniel, "Default Password Removal," U.S. Appl. No. 16/047,959, Jul. 27, 2018, Specification, Claims, Abstract, and Drawings, 37 pages.

Willnauer, Simon Daniel, "Shard Splitting," U.S. Appl. No. 16/176,956 , Oct. 31, 2018, Specification, Claims, Abstract, and Drawings, 47 pages.

"Search Query Report", IP.com, performed Dec. 18, 2020, 4 pages.

* cited by examiner

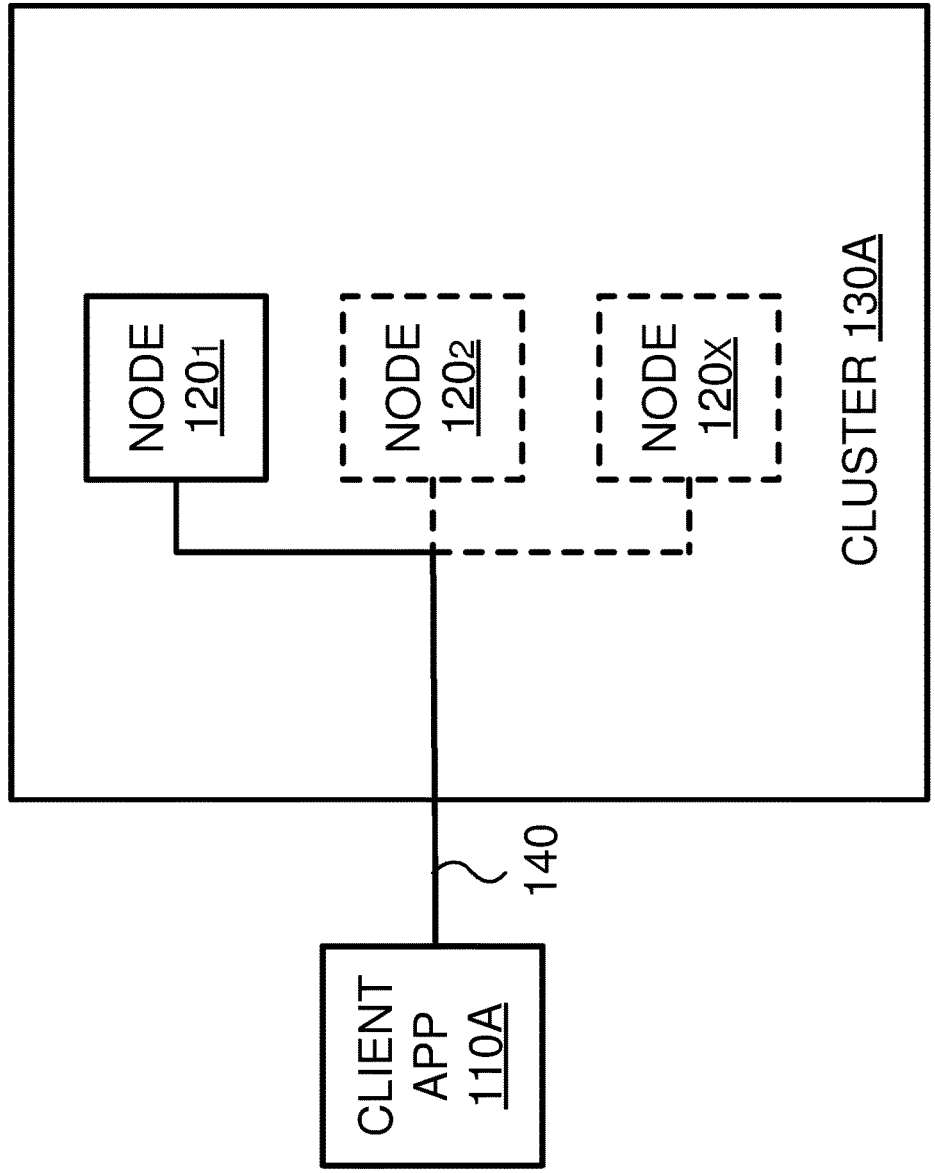

200

```
PUT my_index
{
   "mappings" : {
      "doc" : {
         "properties" : {
            "body" : { "type" : "text" },
            "security_attributes":{"type": "keyword"}
         }
      }
   }
}
PUT my_index/doc/1
{
   "security_attributes": ["living", "in a van", "down by the river"],
   "body": "you're not going to amount to jack squat"
}
PUT my_index/doc/2
{
   "security_attributes": ["living", "in a house", "down by the river"],
   "body": "keep calm, carry on"
}
GET my_index/_search
{
   "query": {
      "terms": {
         "security_attributes": ["living", "in a van", "down by the river"]
      }
   }
}
```

```
GET my_index/_search
{
   "query": {
      "terms_set": {
         "security_attributes": {
            "terms": ["living", "in a van", "down by the river"],
            "minimum_should_match_script": {
               "source": "params.num_terms"
            }
         }
      }
   }
}
```

```
PUT _xpack/security/role/my_policy
{
   "indices": [{
      "names": ["my_index"],
      "privileges": ["read"],
      "query": {
         "template": {
            "source": "{\"bool\": {\"filter\": [{\"terms_set\": {\"security_attributes\": {\"terms\": {{#toJson}}_user.metadata.security_attributes{{/toJson}},\"minimum_should_match_script\":{\"source\":\"params.num_terms\"}}}}]}}"
         }
      }
   }]
}
PUT _xpack/security/user/matt_foley
{
   "username": "matt_foley",
   "password":"testtest",
   "roles": ["my_policy"],
   "full_name": "Matt Foley",
   "email": "mf@rivervan.com",
   "metadata": {
      "security_attributes": ["living", "in a van", "down by the river"]
   }
}
PUT _xpack/security/user/jack_black
{
   "username": "jack_black",
   "password":"testtest",
   "roles": ["my_policy"],
   "full_name": "Jack Black"
   "email": "jb@tenaciousd.com",
   "metadata": {
      "security_attributes": ["living", "in a house", "down by the river"]
   }
}
```

FIG. 4

```
PUT my_index
{
   "mappings": {
      "doc": {
         "properties": {
            "security_attributes": {
               "properties": {
                  "level": {"type":"short"},
                  "programs": {"type":"keyword"},
                  "min_programs": {"type":"short"}
               }
            },
            "body":{"type":"text"}
         }
      }
   }
}
PUT my_index/doc/1
{
   "security_attributes": {
      "level": 2,
      "programs": ["alpha", "beta"],
      "min_programs": 2
   },
   "body": "This document contains information that should only be visible to those at level 2 or higher, with access to both the alpha and beta programs"
}
PUT my_index/doc/2
{
   "security_attributes": {
      "level": 2,
      "programs": ["alpha", "beta", "charlie"],
      "min_programs": 3
   },
   "body": "This document contains information that should only be visible to those at level 2 or higher, with access to the alpha, beta, and charlie programs"
}
PUT my_index/doc/3
{
   "security_attributes": {
      "level": 3,
      "programs": ["charlie"],
      "min_programs": 1
   },
   "body": "This document contains information that should only be visible to those at level 3 or higher, with access to the charlie program"
}
```

```
PUT _xpack/security/role/my_policy
{
  "indices": [
  {
    "names": ["abac-test"],
    "privileges": ["read"],
    "query": {
      "template": {
        "source": "{\"bool\": {\"filter\": [{\"range\": {\"security_attributes.level\": {\
"lte\": \"{{_user.metadata.level}}\"}}},{\"terms_set\": {\"security_attributes.programs\":
{\"terms\": {{#toJson}}_user.metadata.programs{{/toJson}},\
"minimum_should_match_field\": \"security_attributes.min_programs\"}}}, {\"script\":
{\"script\": {\"inline\": \"!LocalDateTime.ofInstant(Calendar.getInstance().toInstant(),
ZoneId.systemDefault()).isAfter(LocalDateTime.parse('{{_user.metadata.certificatio
n_date}}').plusYears(1))\"}}}]}}"
      }
    }
  }]
}
PUT _xpack/security/user/jack_black
{
  "username": "jack_black",
  "password": "testtest",
  "roles": ["my_policy"],
  "full_name": "Jack Black",
  "email": "jb@tenaciousd.com",
  "metadata": {
    "programs": ["alpha", "beta"],
    "level": 2,
    "certification_date": "2018-01-02T00:00:00"
  }
}
PUT _xpack/security/user/barry_white
{
  "username": "barry_white",
  "password": "testtest",
  "roles": ["my_policy"],
  "full_name": "Barry White",
  "email": "bw@cantgetenough.com",
  "metadata": {
    "programs": ["alpha", "beta", "charlie"],
    "level": 2,
    "certification_date": "2018-01-02T00:00:00"
  }
}
```

```
PUT _xpack/security/user/earl_grey
{
   "username": "earl_grey",
   "password": "testtest",
   "roles": ["my_policy"],
   "full_name": "Earl Grey",
   "email": "eg@hot.com",
   "metadata": {
      "programs": ["charlie"],
      "level": 3,
      "certification_date": "2018-01-02T00:00:00"
   }
}
PUT _xpack/security/user/james_brown
{
   "username": "james_brown",
   "password": "testtest",
   "roles": ["my_policy"],
   "full_name": "James Brown",
   "email": "jb2@newbag.com",
   "metadata": {
      "programs": ["alpha", "beta", "charlie"],
      "level": 5,
      "certification_date": "2017-01-02T00:00:00"
   }
}
```

```
curl -u jack_black:testtest http://localhost:9200/my_index/_search
hits: 1
ids: [1]
curl -u barry_white:testtest http://localhost:9200/my_index/_search
hits: 2
ids: [1, 2]
curl -u earl_grey:testtest http://localhost:9200/my_index/_search
hits: 1
ids: [3]
curl -u james_brown:testtest http://localhost:9200/my_index/_search
hits: 0
```

```
┌─────────────────────────────────────────────┐
│ Providing for establishing security         │
│ attributes to a plurality of users,         │
│ actions, and resources for a first service. │
│                     702                     │
└─────────────────────────────────────────────┘
                      ↓
┌─────────────────────────────────────────────┐
│ Providing for mapping the security          │
│ attributes to a user, of the plurality of   │
│ users, based on metadata of the user        │
│ received from a second service, the         │
│ metadata providing dynamic input and        │
│ being indicative of permissions granted to  │
│ the user within the second service as well  │
│ as information that is indicative of the    │
│ user within the second service.             │
│                     704                     │
└─────────────────────────────────────────────┘
                      ↓
┌─────────────────────────────────────────────┐
│ Providing for applying the mapping to a     │
│ query and a role of the user, such that     │
│ access is restricted to a document, of the  │
│ first service resulting from the query,     │
│ based on having each of a set of            │
│ security attributes.                        │
│                     706                     │
└─────────────────────────────────────────────┘
                      ↓
┌─────────────────────────────────────────────┐
│ Providing for determining whether to        │
│ provide access to a document to the user    │
│ as a function of the applying of the        │
│ mapping.                                    │
│                     708                     │
└─────────────────────────────────────────────┘
```

FIG. 7

DOCUMENT-LEVEL ATTRIBUTE-BASED ACCESS CONTROL

FIELD

The present technology pertains in general to security systems and more specifically, to providing access control.

BACKGROUND

The approaches described in this section could be pursued but are not necessarily approaches that have previously been conceived or pursued. Therefore, unless otherwise indicated, it should not be assumed that any approaches described in this section qualify as prior art merely by virtue of their inclusion in this section.

There is a long history of trying to describe and implement a complete and coherent scheme to control access to things. Cryptography to protect access to information, physical security to protect access to spaces, forts and walls to protect access to lands, and so forth. Standards, best practices, and trade secrets exist around all of them. Perfect security is yet to be found, as humans are generally the weakest link.

Along with authentication—do you have a key to get in the door?—is authorization—what can you do once you get inside? Setting up access control conventionally can be very complex, for example, in order to limit access based on multiple factors.

SUMMARY

This summary is provided to introduce a selection of concepts in a simplified form that are further described in the Detailed Description below. This summary is not intended to identify key or essential features of the claimed subject matter, nor is it intended to be used as an aid in determining the scope of the claimed subject matter.

The present disclosure provides various embodiments of systems and methods for document-level attribute-based access control.

In various embodiments, a document-level attribute-based access control service is positioned between a directory service and a search engine service, the directory service managing information and permissions for users, the document-level attribute-based access control service mapping security attributes to the user based on the information and permissions. Based on the mapping, the document-level attribute-based access control service can determine whether to permit the user, making a query to the search engine service, to access certain documents resulting from the query. The user information and permissions attributes can be injected into queries dynamically via a template. User attributes may be combined with role query templates to create document-level attribute-based access control on top of a role-based access control scheme. The document-level attribute-based access control service enables enforcement of security policies requiring all of a combination of attributes to be satisfied before permitting certain access.

In various embodiments, the computer-implemented method for document-level attribute-based access control (ABAC), includes providing for establishing security attributes for a plurality of users, actions, and resources for a first service; providing for mapping the security attributes to a user, of the plurality of users, based on metadata of the user received from a second service; the metadata providing dynamic input and being indicative of permissions granted to the user within the second service as well as information that is indicative of the user within the second service; providing for applying the mapping to a query and a role of the user, such that access is restricted to a document, of the first service resulting from the query, based on having each of a set of the security attributes; and providing for determining whether to provide access to a document to the user as a function of the applying of the mapping.

The first service can comprise a search engine service and the second service can comprise a directory service. The mapping of the security attributes may be defined by a domain-specific language having parameters that match with one or more of the security attributes assigned to the user from the second service.

The method may include receiving an access request for the first service from a computing device associated with the user, prior to the step of providing access.

The applying of the mapping can include evaluating the security attributes for a query regarding a particular one of the users and the first service; determining, based at least in part on the metadata for the user, whether, in a received command, the security attributes for a particular user meet each of a plurality of specified conditions; and based on the determining that the attributes for a particular user do not satisfy each of the plurality of specified conditions, not authorizing access to actions and resources of the first service specified in the command. The method can include, based on the determining that the security attributes for a particular user do satisfy each of the plurality of specified conditions, authorizing access to actions and resources, as specified in the command, of the first service.

In some embodiments, the specified conditions comprise matching a plurality of terms and corresponding security attributes for the user.

BRIEF DESCRIPTION OF THE DRAWINGS

Embodiments are illustrated by way of example, and not by limitation, in the figures of the accompanying drawings, in which like references indicate similar elements and in which:

FIG. 1 is a simplified block diagram of a system having a distributed application structure, according to some embodiments.

FIG. 2 illustrates a JSON code example associated with a query.

FIG. 3 shows another JSON example.

FIG. 4 is another JSON example that adds on to the examples in FIG. 2 and FIG. 3 and includes a Mustache template.

FIG. 5A is part one of three for another longer JSON example.

FIG. 5B is part two of three for another longer JSON example.

FIG. 5C is part three of three for another longer JSON example.

FIG. 6 shows exemplary expected results from the example in FIG. 5.

FIG. 7 illustrates a simplified flow diagram of a method according to an example embodiment.

DETAILED DESCRIPTION

Figure 8:
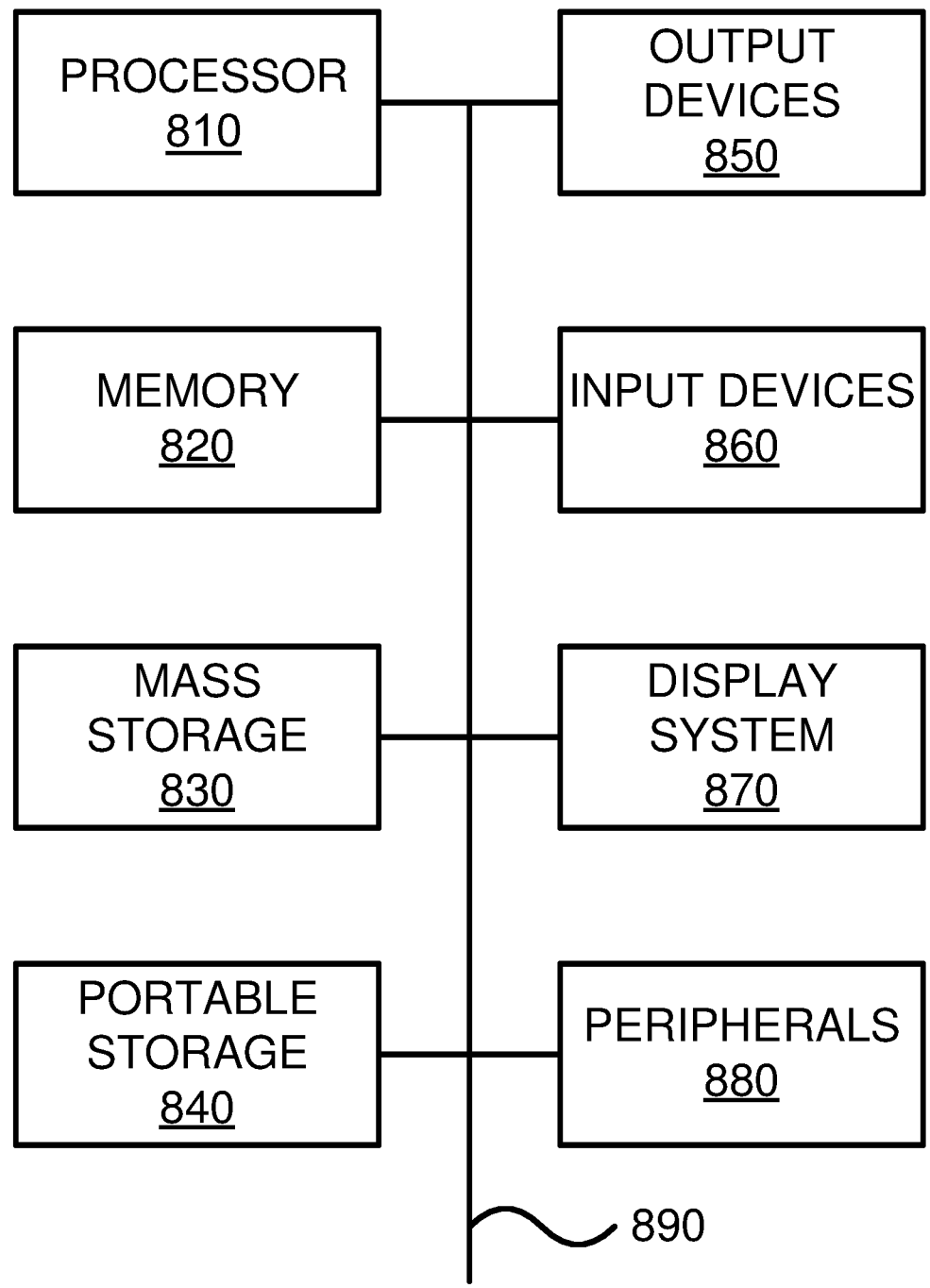
FIG. 8 is a simplified block diagram of a computing system, according to some embodiments.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

The present disclosure is related to various embodiments of systems and methods for Document-Level Attribute-Based Access Control (ABAC).

Before further detailing certain aspect of the systems and methods for Document-Level ABAC, details regarding the distributed application structure will be described with reference to FIG. 1.

FIG. 1 is a simplified diagram illustrating a system 100 to illustrate certain concepts of the distributed nature and distributed application structure, according to some embodiments. System 100 includes client application 110A, one or more nodes 1201-120X, and connections 140. Collectively, one or more nodes 1201-120X form cluster 130A. When only one node (e.g., node 1201) is running, then cluster 130A is just one node. In various embodiments, a cluster (e.g., cluster 130A) is a collection of one or more nodes (servers) (e.g., one or more nodes 1201-120X) that together store data and provides federated indexing and search capabilities across all nodes. A cluster can be identified by a unique name, such that a node can be part of a cluster when the node is set up to join the cluster by its name. A cluster may have only one node in it. In some embodiments, a node (e.g., one or more nodes 1201-120X) is a single server that is part of a cluster (e.g., cluster 130A), stores data, and participates in the cluster's indexing and search capabilities. A node can be identified by a name which by default is a random Universally Unique IDentifier (UUID) that is assigned to the node at startup. Any number of nodes can be in a single cluster. In some embodiments, nodes (e.g., one or more nodes 1201-120X) can communicate using an application protocol (e.g., Hypertext Transfer Protocol (HTTP), transport layer protocol (e.g., Transmission Control Protocol (TCP)), and the like. Nodes can know about all the other nodes in the cluster (e.g., cluster 130A) and can forward client (e.g., client 11A) requests to the appropriate node. Each node can serve one or more purposes, master node and data node.

Each of client application 110A and one or more nodes 1201-120X can be a container, physical computing system, virtual machine, and the like. Generally, client application 110A can run on the same or different physical computing system, virtual machine, container, and the like as each of one or more nodes 1201-120X. Each of one or more nodes 1201-120X can run on the same or different physical computing system, virtual machine, container, and the like as the others of one or more nodes 1201-120X. A physical computing system is described further in relation to the exemplary computer system 800 of FIG. 8. Virtual machines may provide a substitute for a physical computing system and the functionality needed to execute entire operating systems. Virtual machines can be created and run by a hypervisor which uses native execution to share and manage hardware, allowing for multiple environments which are isolated from one another, yet can exist on the same physical computing system. Further details regarding the distributed application structure in FIG. 1 can be found in commonly assigned U.S. patent application Ser. No. 16/047,959, filed Jul. 27, 2018 and Ser. No. 16/176,956, filed Oct. 31, 2018 and incorporated by reference herein.

Having described certain details regarding the distributed application structure in FIG. 1, the description turns to describing further details concerning various embodiments of the document-level attribute-based access control.

In computer security, authorization, i.e. access control, comes in a number of flavors. Role-based access control (RBAC) is one such scheme. RBAC is characterized by the collection of privileges (i.e. the specific list of things you can do) into roles such that the only way for a user to obtain a privilege is to be assigned membership in one or more roles. This method makes sense in a traditional hierarchical environment where there are clear lines of authority and responsibility around a relatively few number of different job types. A simple example is with employee records: the HR director role can view and edit all employee records, the manager role can view employee records for those they manage, and employees can only view their records.

Role-based access control can be useful in certain circumstances, but has some limitations. For example, role explosion can occur where the number of roles would balloon as an organization grew and as the number of kinds of data grew making their management unwieldy to define custom roles per user, especially where there are more than a small number of users. For another example of a drawback, keeping roles mutually exclusive and collectively exhaustive (MECE) is difficult and potentially risky if not managed properly, meaning it would be possible to grant someone a number of contradictory roles that could result in a leak of data or other unintended behaviors.

In addition, roles are meant to be generic and applicable to many people such that user-specific information is not taken into account in RBAC. For example, to view a person's private health information, a number of conditions must be met to include a recent Health Insurance Portability and Accountability Act (HIPAA) training certificate. Since everyone can take the training on different dates, no single role can take into account a person's training status.

In addition to HIPAA, other security policies may involve Financial Services portfolio management, and multi-tenanted SaaS products that all generate data that is sensitive enough to deserve Mandatory Access Controls (MAC) at the data layer and basic access control policies.

Attribute-based access control can be an authorization scheme. ABAC can use attributes assigned to users, things, and actions, and a policy to make decisions based on them. For a user, attributes could include projects they work on, team memberships, certifications, years of service, and physical location, to name just several possibilities. For a thing (i.e., resource), attributes could be sensitivity level, personally identifying information (PII) status, protected health information (PHI), time-to-live (TTL), or physical location.

An example control policy in ABAC is printing information in a secured environment. A user can only print (action) from a specific printer (resource) if the user is allowed to print things (action attribute+user attribute), that printer is near the user's workspace (resource attribute+user attribute), and the user's security training is up to date (contextual information: current date+user attribute). In RBAC, a user would need a printing role, a role for each printer (how many thousands in a big organization), need to update printing role membership everyday as users slipped out of training compliance, and update the membership in the printers' roles each day as people joined, left, and moved throughout the organization. The present technology is not limited to the action being print or the resource being a printer, and the action attribute and user attribute being print thing, as those are just nonlimiting examples of an actions, resource, action attribute, and user attribute.

One of the many advantages of various embodiments of the present technology compared to role-based access control, for example is that, even as the number of roles would balloon as an organization grew and as the number of kinds of data grew, managing access control can be much simpler and not unwieldy. In addition, the present technology can avoid other drawbacks including the above-mentioned ones of role-based access control (RBAC). Regarding the example of viewing a person's private health information, HIPAA training certificate status can be an attribute of the user.

In various embodiments, attribute-based access control depends on attributes assigned to users, things, and actions, and a policy to make decisions based on them. For a user, attributes could include projects they work on, team memberships, certifications, years of service, and physical location. For a thing (i.e. resource), attributes could be sensitivity level, PII status, PHI status, time-to-live, or physical location.

A primary reason this document-level ABAC has or could not have been done before has to do with how lists of values—lists being a very common type of ABAC attribute—were handled. With its roots deep in information retrieval, the Lucene information retrieval software library was tuned to be "greedy" in finding things. For instance, a list of values for a single field was used as a logical OR in a search; there was no logical AND. This refers to structured fields like int and keyword.

In various embodiments, attributes are established for users, actions, and resources of a first service, e.g., the Lucene information retrieval software library service. Although certain embodiments are described with reference to queries and the Lucene information retrieval software library, the present technology is not so limited. In some embodiments, a query to a service may be used that is expressed using a JSON domain-specific language (DSL).

FIG. 2 illustrates a JSON code example 200. In this example "terms" query, the query would return both documents (document 1 (doc/1) and document 2 (doc/2)) having "security_attributes" "living", OR "in a van", OR "down by the river". Thus, there was just an ORing and not an ANDing of the security attributes, in this example.

In various embodiments, for document-level ABAC, using terms_set, a user can now enforce the existence of all three attributes, e.g., implementing ANDing. In the example in FIG. 2, the query "security_attributes": ["living", "in a van", "down by the river"] would only return the first documents since all attributes are present in the first document and not in the second. In this example, by setting terms along with the security attributes, the query can be restricted.

FIG. 3 shows another JSON example 300. In this example, minimum_should_match_script was used, but it is not the most efficient pattern. The alternative minimum_should_match_field can be the better approach, but using it in the example would have required adding the length of the "security_attributes" array as a separate field to the documents, so the example in FIG. 3 went with brevity. In this example, by setting terms and a minimum match, along with the security attributes, the query can be further restricted.

In various embodiments, when defining a role using various security features, a user can optionally specify a query template that will apply to every query made by users with that role. It is a document level security control that restricts access to documents in search queries as well as aggregations, according to various embodiments. The template can make use of user attributes via a Mustache template (e.g., using a template since do not the values up front).

A Mustache template can be a logicless template engine for creating dynamic content like HTML, configuration files among other things. The template engine can be classified as logicless because it does not have constructs that support if-else statements and for loops. The Mustache templates can consist of tag names surrounded by {{ }} (which resemble mustaches from which the name is derived) and are backed by a model object containing the data for the template.

When the Mustache template is evaluated, one can substitute the items that are templated within that text. When applied to a query and a role, this allows the query to be very dynamic. This can be tied together with a user, by providing the metadata for a user to the Mustache engine when evaluating a template, which essentially can allows the values from the user's metadata to be pulled, from a second service such as a directory service, into a template and that text can become the text representation for that query for that user at that given time.

By combining user attributes with role query templates, it is possible to create ABAC logic on top of an RBAC scheme. Most security policies required this "list ANDed" logic for injecting user attributes into role queries via a template.

Expanding the example in FIG. 3, keeping the same two documents and adding two users and a role, results, for example, in FIG. 4.

FIG. 4 is another JSON example 400 building on the examples in FIG. 2 and FIG. 3. In the example, decoding that role template query is like seeing the matrix but it is essentially the same as the term_set query from above. The only difference is the use of the {{_user.metadata.security_attributes}} having a Mustache template in place of the hard coded attribute list. By adding in those security attributes from the user metadata in this example, has made this role apply user-specific attributes. In this example, the user-specific attributes are applied to each query a user with that role makes, such that it is an attribute-based access control query.

Referring to FIG. 2-FIG. 4, for the example in FIG. 4, if user Matt Foley were to login and run a query, the only document he would be able to see is document 1 (Matt Foley's security attributes in FIG. 4 are "living", "in a van", "down by the river" which matches the security attributes associated with document 1 only, in FIG. 2). Matt Foley would not see document 2 (referred to in FIG. 2) in this example, because Matt Foley only has two of the three security attributes specified for document 2 and the terms_set filter in the role query template says the minimum number that must match is all of them (for the {{_user.metadata.security_attributes}} the params.num_terms is equal to the number of terms in the list, 3 in this case). Similarly, Jack Black would only be able to see document 2 (e.g., since his security attributes are "living", "in a house", "down by the river" which matches the security attributes associated with document 2 only, in FIG. 2.

In the above example, document 1 might have three required attributes and document 2 might have four. Although one might consider building the right queries for each user and document, there are a number of drawbacks to that approach. For example, user attributes can be both a subset and a superset of document attributes. In cases where the user attributes are a superset of document attributes, for instance, performing a query that requires having all user attributes would result in no documents back because the user attributes are a superset. For the above example, a user may have the following user attributes ["I am 35", "living", "in a van", "down by the river"] that are a superset of the document attributes. If a document query is done conventionally including requiring that all user attributes are satisfied, no documents would come back since the document attributes have only a subset of those user attributes. However, access control policy is typically always an "at least these attributes" versus "exactly this list and nothing more". Therefore, to make this work conventionally, one would need to split out each possible attribute list value into its own attribute. As a result, that conventional approach requires logic that gets very complicated since there must be a large number of existence checks to get around the same superset problem. Consequently, the resulting combination of logic would have an unacceptable level of complexity. Various embodiments of the present technology provide an inventive concept and improvement in computer technology that provides embodiments of document-level attribute-based access control in a way that overcomes the drawbacks of the conventional approaches.

FIG. 5A continued on to FIG. 5B and continued on to FIG. 5C is another longer JSON example. (For space reasons the example is broken into three parts identified as 500A, 500B, and 500C respectively). FIG. 5A-5C, show an example of how this all comes together with something slightly more complicated, combining three kinds of logic. First, there is a security level ("level") to ensure a user has a level greater than or equal to that of the document. Secondly, there is a program list (e.g., "programs" "min_programs") to check if the user has access to the necessary programs. Thirdly, there is a date to determine if a user has taken the mandatory certification training within that past year. In this example, the date comparison is done via an embedded script, which is not the most efficient solution, but it is just an example and illustrates the point.

Note that, considering that the documents themselves contain the security "policy", care should be given to permissions to update those documents. A recommendation would be to secure the security fields using Field Level Security.

FIG. 6 shows exemplary expected results from the example in FIG. 5A-5C. In this example, James Brown would not get any documents back (hits: 0). The reason is that his certification date is over one year old based on my_policy attribute, and not an attribute of the document.

FIG. 7 is a simplified flow diagram of a method 700 for document-level access-based control according to an example embodiment, with further details described above and below. FIG. 7 is simplified for the example embodiment, details regarding other embodiments and aspect are described further herein.

For the simplified flow according to an example embodiment, step 702 includes providing for establishing a plurality of security attributes to a plurality of users, actions, and resources for a first service, as described further herein.

In the simplified example in FIG. 7, step 704 includes providing for mapping attributes of the plurality of attributes a user of the plurality of users based on metadata of the user received from a second service; the metadata providing dynamic input and being indicative of permissions granted to the user within the second service as well as information that is indicative of the user within the second service, as described further herein.

In the simplified example in FIG. 7, step 706 includes providing for applying the mapping to a query and a role of the user, such that access is restricted to a document, of the first service resulting from the query, based on combinations of security attributes, as described further herein.

In the simplified example in FIG. 7, step 708 includes providing for determining whether to provide access to a document to the user as a function of the applying of the mapping, as described further herein.

In some embodiments, the first service comprises a search engine service and the second service comprises a directory service and the mapping of the attributes is defined by a domain-specific language having parameters that match with one or more of the attributes assigned to the user from the second service.

Based on the mapping, the document-level attribute-based access control service can determine whether to permit the user, making a query to the search engine service, to access certain documents resulting from the query. The user information and permissions attributes can be injected into queries dynamically via a template. User attributes may be combined with role query templates to create document-level attribute-based access control on top of a role-based access control scheme. The document-level attribute-based access control service enables enforcement of security policies requiring all of a combination of attributes to be satisfied before permitting certain access.

FIG. 8 illustrates an exemplary computer system 800 that may be used to implement some embodiments of the present invention. The computer system 800 in FIG. 8 may be implemented in the contexts of the likes of computing systems, networks, servers, or combinations thereof. The computer system 800 in FIG. 8 includes one or more processor unit(s) 810 and main memory 820. Main memory 820 stores, in part, instructions and data for execution by processor unit(s) 810. Main memory 820 stores the executable code when in operation, in this example. The computer system 800 in FIG. 8 further includes a mass data storage 830, portable storage device 840, output devices 850, user input devices 860, a graphics display system 870, and peripheral device(s) 880.

The components shown in FIG. 8 are depicted as being connected via a single bus 890. The components may be connected through one or more data transport means. Processor unit(s) 810 and main memory 820 are connected via a local microprocessor bus, and the mass data storage 830, peripheral device(s) 880, portable storage device 840, and graphics display system 870 are connected via one or more input/output (I/O) buses.

Mass data storage 830, which can be implemented with a magnetic disk drive, solid state drive, or an optical disk drive, is a non-volatile storage device for storing data and instructions for use by processor unit(s) 810. Mass data storage 830 stores the system software for implementing embodiments of the present disclosure for purposes of loading that software into main memory 820.

Portable storage device 840 operates in conjunction with a portable non-volatile storage medium, such as a flash drive, floppy disk, compact disk, digital video disc, or Universal Serial Bus (USB) storage device, to input and output data and code to and from the computer system 800 in FIG. 8. The system software for implementing embodiments of the present disclosure is stored on such a portable medium and input to the computer system 800 via the portable storage device 840.

User input devices 860 can provide a portion of a user interface. User input devices 860 may include one or more microphones, an alphanumeric keypad, such as a keyboard, for inputting alphanumeric and other information, or a pointing device, such as a mouse, a trackball, stylus, or cursor direction keys. User input devices 860 can also include a touchscreen. Additionally, the computer system 800 as shown in FIG. 8 includes output devices 850. Suitable output devices 850 include speakers, printers, network interfaces, and monitors.

Graphics display system 870 include a liquid crystal display (LCD) or other suitable display device. Graphics display system 870 is configurable to receive textual and graphical information and processes the information for output to the display device.

Peripheral device(s) 880 may include any type of computer support device to add additional functionality to the computer system.

Some of the components provided in the computer system 800 in FIG. 8 can be those typically found in computer systems that may be suitable for use with embodiments of the present disclosure and are intended to represent a broad category of such computer components. Thus, the computer system 800 in FIG. 8 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computing system 800 may be implemented as a cloud-based computing environment, such as a virtual machine operating within a computing cloud. In other embodiments, the computing system 800 may itself include a cloud-based computing environment, where the functionalities of the computing system 800 are executed in a distributed fashion. Thus, the computing system 800, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computing system 800, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, e.g., optical, magnetic, and solid-state disks, such as a fixed disk. Volatile media include dynamic memory, such as system random-access memory (RAM). Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, e.g., a floppy disk, a flexible disk, a hard disk, magnetic tape, any other magnetic medium, a CD-ROM disk, digital video disk (DVD), any other optical medium, any other physical medium with patterns of marks or holes, a RAM, a programmable read-only memory (PROM), an erasable programmable read-only memory (EPROM), an electrically erasable programmable read-only memory (EEPROM), a Flash memory, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (e.g., through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

What is claimed is:

1. A computer-implemented method for document-level attribute-based access control (ABAC), the computer-implemented method comprising: providing for establishing security attributes for a plurality of users, actions, and resources for a first service; providing for mapping the security attributes to a particular user, of the plurality of users, based on metadata of the particular user received from a second service, the metadata providing dynamic input and being indicative of permissions granted to the particular user within the second service as well as information that is indicative of the particular user within the second service; providing for applying the mapping to a query and a role of the particular user, such that access is restricted to a document, of the first service resulting from the query, based on the mapping having a match for each of a set of the security attributes; and providing for determining whether to provide access to the document to the particular user as a function of the applying of the mapping, wherein the mapping of the security attributes is defined by a domain-specific language having parameters that match with one or more of the security attributes assigned to the particular user from the second service.

2. The computer-implemented method of claim 1, further comprising receiving an access request for the first service from a computing device associated with the particular user, prior to the step of providing for determining whether to provide access.

3. The computer-implemented method of claim 1 wherein the applying the mapping further comprises:
    evaluating the security attributes for the query regarding the particular user of the plurality of users and the first service;
    determining, based at least in part on the metadata for the particular user, whether, in a received command, the security attributes for the particular user meet each of a plurality of specified conditions; and
    based on the determining that the security attributes for the particular user do not satisfy each of the plurality of specified conditions, not authorizing access to actions and resources of the first service specified in the command.

4. The computer-implemented method of claim 3, further comprising based on the determining that the security attributes for the particular user do satisfy each of the plurality of specified conditions, authorizing access to actions and resources, as specified in the command, of the first service.

5. The computer-implemented method of claim 3, wherein the specified conditions comprise matching a plurality of terms and corresponding security attributes for the particular user.

6. A computer-implemented method for document-level attribute-based access control (ABAC), the computer-implemented method comprising: providing for establishing security attributes for a plurality of users, actions, and resources for a first service; providing for mapping the security attributes to a particular user, of the plurality of users, based on metadata of the particular user received from a second service, the metadata providing dynamic input and being indicative of permissions granted to the particular user within the second service as well as information that is indicative of the particular user within the second service; providing for applying the mapping to a query and a role of the particular user, such that access is restricted to a document, of the first service resulting from the query, based on the mapping having a match for each of a set of the security attributes; and providing for determining whether to provide access to the document to the particular user as a function of the applying of the mapping, wherein the mapping utilizes a Mustache template such that the metadata for the particular user is provided to a Mustache engine for evaluating the Mustache template.

7. The computer-implemented method of claim 1 wherein the query comprises an aggregation or a search query.

8. The computer-implemented method of claim 1 wherein, based on the security attributes, the plurality of users can only take an action from a resource if:
the particular user of the plurality of users is allowed to take the action, the resource is at an attribute specified physical location, and security training of the particular user is up to date.

9. The computer-implemented method of claim 1 wherein the determining comprises restricting access to the resources to the particular user as a function of the mapping and a combination of the security attributes.

10. The computer-implemented method of claim 1 wherein the determining comprises restricting access of the particular user to one or more of the actions.

11. The computer-implemented method of claim 1 wherein the security attributes for the particular user include at least one of: a membership, a certification, years of service, and physical location.

12. The computer-implemented method of claim 11, wherein the security attributes include a period for which the certification is valid for the particular user, the determining comprising restricting access to the particular user if the certification is no longer valid or has lapsed.

13. A system comprising a document-level attribute-based access control service configured to: provide for establishing a plurality of security attributes to a plurality of users, actions, and resources for a first service; provide for mapping security attributes of the plurality of security attributes to a particular user, of the plurality of users, based on metadata of the particular user received from a second service; the metadata providing dynamic input and being indicative of permissions granted to the particular user within the second service as well as information that is indicative of the particular user within the second service; provide for applying the mapping to a query and a role of the particular user, such that access is restricted to a document, of the first service resulting from the query, based on having each security attribute of a set of the security attributes; and provide for determining whether to provide access to a document to the particular user as a function of the applying of the mapping, wherein the mapping of the security attributes is defined by a domain-specific language having parameters that match with one or more of the security attributes assigned to the particular user from the second service.

14. The system of claim 13, wherein the document-level attribute-based access control service is distinct from and communicatively coupled to the first service and the second service.

15. The system of claim 13, wherein the document-level attribute-based access control service is configured to function as an application programming interface between the first service and the second service, the document-level attribute-based access control service providing the mapping and an assignment of security attributes and roles to the users.

16. The system of claim 13, wherein the first service comprises a search engine service and the second service comprises an attribute management directory service of a network protocol layer.

17. The computer-implemented method of claim 1, wherein the first service comprises a search engine service and the second service comprises a directory service.

18. The system of claim 13, wherein the first service comprises a search engine service and the second service comprises a directory service.

* * * * *